(12) United States Patent
Bussien (10) Patent No.: US 12,427,728 B2
(45) Date of Patent: Sep. 30, 2025

(54) REDUCED-FRICTION DRIVE DEVICE

(71) Applicant: AISAPACK HOLDING SA, Vouvry (CH)

(72) Inventor: Gaël Bussien, Le Bouveret (CH)

(73) Assignee: AISAPACK HOLDING S.A., Vouvry (CH)

( * ) Notice: Subject to any disclaimer, the term of this patent is extended or adjusted under 35 U.S.C. 154(b) by 377 days.

(21) Appl. No.: 17/597,694

(22) PCT Filed: Jul. 1, 2020

(86) PCT No.: PCT/IB2020/056217
§ 371 (c)(1),
(2) Date: Jan. 18, 2022

(87) PCT Pub. No.: WO2021/014241
PCT Pub. Date: Jan. 28, 2021

(65) Prior Publication Data
US 2022/0176645 A1 Jun. 9, 2022

(30) Foreign Application Priority Data
Jul. 19, 2019 (EP) .................................... 19187382

(51) Int. Cl.
*B29C 65/00* (2006.01)
*B29C 65/78* (2006.01)
*B29L 31/00* (2006.01)

(52) U.S. Cl.
CPC .... *B29C 66/83423* (2013.01); *B29C 65/7894* (2013.01); *B29C 66/4322* (2013.01);
(Continued)

(58) Field of Classification Search
CPC ... Y10T 156/1013; B29C 53/36; B29C 53/48; B29C 53/50; B29C 53/52; B29C 53/54; B29C 65/787; B29C 65/7873; B29C 66/49; B29C 66/4322; B29C 66/83423; B29C 66/83421; B29C 66/83431; B29C 66/81265; B29C 65/7894
(Continued)

(56) References Cited

U.S. PATENT DOCUMENTS

| 3,388,017 | A | 6/1968 | Grimsley et al. |
| 3,464,879 | A | 9/1969 | Poulsen |
| 5,569,144 | A | 10/1996 | Schwyn |

FOREIGN PATENT DOCUMENTS

| DE | 202011050417 | 6/2012 |
| EP | 0498764 | 8/1992 |

(Continued)

OTHER PUBLICATIONS

Machine translation of EP 0498764 date unknown.*
(Continued)

*Primary Examiner* — John L Goff, II
(74) *Attorney, Agent, or Firm* — NIXON & VANDERHYE (57) ABSTRACT

Device for forming a tube, for example a packaging tube, from a sheet (3), said device comprising at least one welding rod (2), means for welding and pressurizing the welded zone (7-9) and means (4-6) for driving the sheet (3) along the rod (2). The device also comprises means (10-12, 14) that reduce the friction between the welding rod (2) and the sheet (3).

16 Claims, 9 Drawing Sheets

(52) U.S. Cl.
CPC ............... *B29C 66/81265* (2013.01); *B29K 2995/0097* (2013.01); *B29L 2031/712* (2013.01)

(58) Field of Classification Search
USPC .................................................. 156/203, 466
See application file for complete search history.

(56) References Cited

FOREIGN PATENT DOCUMENTS

| EP | 0787572 | B1 | 10/2001 |
|----|---------|----|---------|
| FR | 1418537 |    | 11/1965 |
| FR | 1418537 | A  | 11/1965 |
| GB | 190929134 | A | 4/1910 |
| GB | 904865 | A | 8/1962 |
| JP | 09-155967 | A | 6/1997 |
| RU | 2538258 | C2 | 1/2015 |
| RU | 2627135 | C2 | 8/2017 |
| WO | 94/04343 | A1 | 3/1994 |
| WO | 2012/126656 | | 9/2012 |

OTHER PUBLICATIONS

Search Report dated Oct. 6, 2023, issued in Russian Federation Application No. 2022101273/04, 2 pages.
Inquiry under the Substantive Examination dated Oct. 9, 2023, issued in Russian Federation Application No. 2022101273/04, 7 pages.
Examination Report dated Apr. 26, 2023, issued in India Application No. 202217006941, 5 pages.
Office Action dated Dec. 21, 2023, issued in Japan Patent Application No. 2021-572451, 4 pages.
International Search Report for PCT/IB2020/056217 mailed Oct. 20, 2020, 4 pages.
Written Opinion of the ISA for PCT/IB2020/056217, mailed Oct. 20, 2020, 6 pages.
Second Office Action dated Mar. 27, 2023, issued in China Application No. 202080045236.0 and English translation, 12 pages.
First Office Action dated Nov. 3, 2022, issued in China Application No. 202080045236.0, and English translation, 13 pages.

\* cited by examiner

REDUCED-FRICTION DRIVE DEVICE

CORRESPONDING APPLICATION

This application is the U.S. national phase of International Application No. PCT/IB2020/056217 filed on 1 Jul. 2020, which designated the U.S. and claims the priority of the earlier European application No. EP19187382.7 filed on Jul. 19, 2019 in the name of AISAPACK HOLDING SA, the entire contents of each of which are hereby incorporated by reference.

Field of the Invention and Problem to be Solved

Devices for continuously welding a sheet to form a tube comprise at least the following steps:
 positioning the sheet around a welding rod,
 positioning the ends of the sheet that are to be welded,
 heating the zone to be welded,
 pressurizing the zone to be welded,
 cooling the welded zone.

Figure 1:
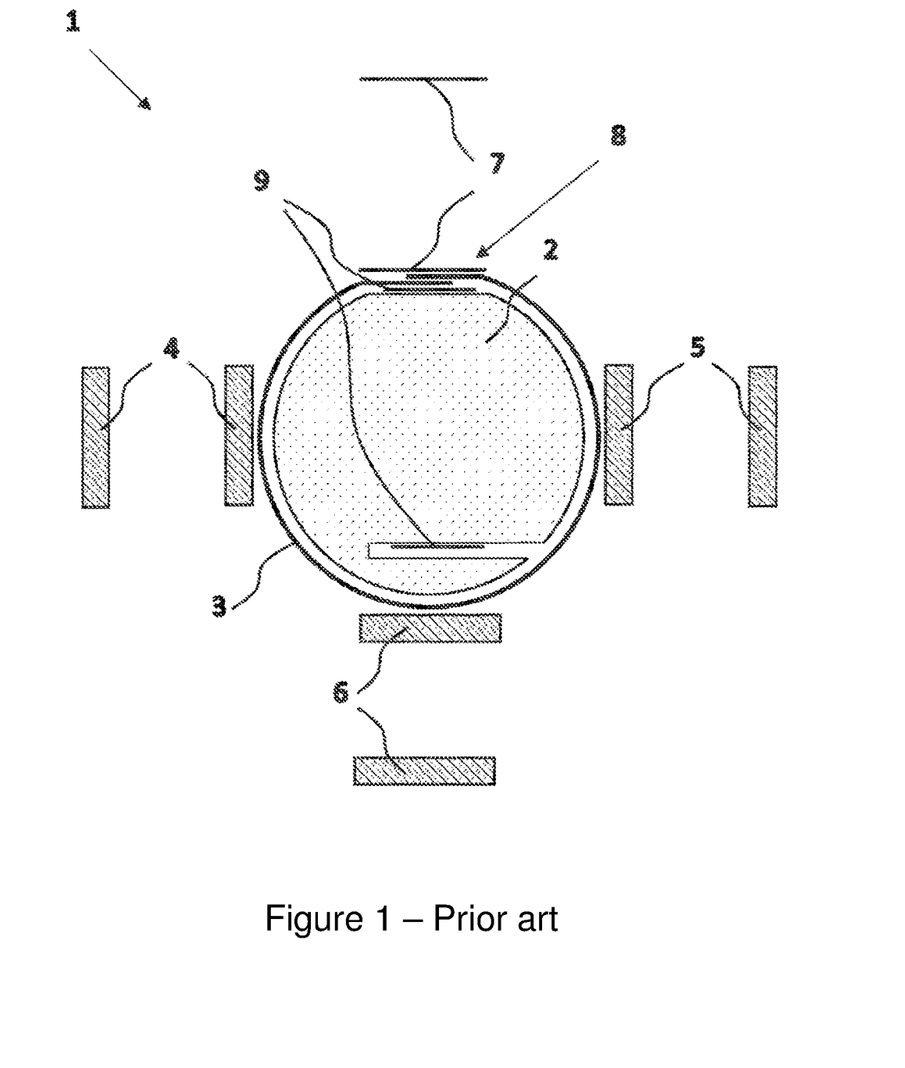
FIG. 1 illustrates a drive device of the prior art. The sheet is driven by the drive belts 4, 5 and 6 and, at the level of the weld, by the belts 7 and 9. The sheet 3 rubs on the rod 2 in front of the drive belts 4, 5 and 6.

Driving the sheet 3 around the welding rod 2 requires a device for driving the sheet. Drive belts 4-6 arranged around the welding rod 2 are commonly used to drive the sheet 3. An example of a device 1 of the prior art is illustrated in FIG. 1.

The disadvantage with the existing devices is the generation of friction between the inner face of the sheet and the welding rod. The outer face of the sheet which will form the outer face of the tube being formed is driven by contact, ideally without sliding, between the drive belts 4 to 6 and the outer face of the sheet, whereas the inner face of the sheet 3 slides on the welding rod 2. At a low speed of movement of the sheet, the friction generated is low and does not affect the inner face of the tube. At a high production speed, abrasion of the inner face of the tube may occur, generating dust which accumulates in the tube formed and which poses problems in terms of quality. In other cases, the friction creates premature wear of the rod 2 on account of slip agents added to the sheet 3. In other cases, the problem appears even at low production speeds owing to the use of new materials in the sheet or owing to the use of recycled material. It is therefore of great benefit to create a continuous welding device in which the friction is reduced between the sheet 3 and the rod 2.

SUMMARY OF THE INVENTION

One aim of the invention is therefore to improve the devices, machines and methods for manufacturing packaging tubes.

Another aim is to overcome the problems encountered in the known machines, as described above.

The invention consists in particular, but not exclusively, of a continuous welding device and method for the fabrication of tubes that generates low friction between the welded sheet and said device, that is to say the welding rod.

The invention is illustrated by FIGS. 2 to 6. FIG. 1 shows an example of the prior art.

In some embodiments, the invention relates to a welding device for forming a tube, for example a packaging tube, from a sheet, the device comprising at least one welding rod, means for welding and pressurizing the welded zone, and drive means for driving the sheet along the rod. The device further comprises means intended to reduce the friction between the welding rod and the sheet.

In some embodiments, the friction-reducing means may comprise at least one antifriction belt.

In some embodiments, the antifriction belt is preferably opposite at least one of the means for driving the sheet along the rod.

In some embodiments, the friction-reducing means may comprise a plurality of antifriction belts, for example three.

In some embodiments, the sheet may move at the same speed as the antifriction belt(s).

In some embodiments, the antifriction belt(s) may be driven by the sheet, or by a motor or by a welding belt.

In some embodiments, the coefficient of static friction $C_f$ between the antifriction belt and the sheet is preferably greater than the coefficient of static friction $C_t$ between the antifriction belt and the rod.

In some embodiments, the ratio $C_f/C_t$ is greater than 1 and preferably greater than 1.5. Other values are of course possible.

In some embodiments, in order to obtain a favorable ratio $C_f/C_t$, the surface properties of the rod can be adapted by adjusting its roughness and/or by a surface treatment of the rod and/or by applying a fine-thickness coating, for example a Résiflon-type coating, to the surface of the rod.

In some embodiments, the antifriction belt(s) preferably has/have a thickness of less than 3 mm. Other values are of course possible within the scope of the present invention.

In some embodiments, the width of the antifriction belt(s) can vary as a function of the diameter of the tube.

In some embodiments, the width of the antifriction belt(s) can be greater than 3 mm. Other dimensions are of course possible, being smaller or greater.

In some embodiments, the antifriction belt(s) can be made of single-layer or multilayer synthetic material(s) or metallic material(s). Combinations of materials are also possible.

In some embodiments, an insert which traps the antifriction belt(s) can be added within the rod and serve jointly as a friction piece with the belt(s).

In some embodiments, the friction-reducing means can comprise at least one roller. The roller(s) can be made of any suitable material.

In some embodiments, the roller(s) can be optionally driven to rotate.

In some embodiments, the cross section of the tube can be circular and/or oval and/or rectangular and/or square. It can also pass from one shape to another shape along its longitudinal axis.

DESCRIPTION OF THE FIGURES

FIGS. 1 to 6 show sectional views of a continuous welding device for the preparation of welded packaging tubes from a single-layer or multilayer sheet. The viewing direction corresponds to the axis of travel of the sheet, which is wound around a welding rod for FIGS. 1 to 5, 7 and 8 and perpendicular to this axis for FIGS. 6 and 9.

Only the elements relevant for the explanation of the invention are shown, in particular the elements of the device which are used to drive the sheet. The elements for heating, cooling and pressurizing the weld are not shown and are, for example, illustrated in the publication WO9404343 incorporated by reference in the present application for these aspects. The figures of the publication WO9404343A1 illustrate another configuration of the prior art close to that shown in FIG. 1 of the present application.

FIG. 2 illustrates a first embodiment of the low-friction drive device according to the invention. This device comprises an antifriction belt 10 in front of the drive belt 6. The rubbing of the sheet on the rod 2 in front of the belt 6 is done away with.

NUMERICAL REFERENCES

1: sectional view of the drive device
2: welding rod
3: sheet
4: lateral drive belt
5: lateral drive belt
6: lower drive belt
7: outer welding belt
8: welding zone
9: inner welding belt
10: antifriction belt
11: antifriction belt
12: antifriction belt
13: enveloping belt
14: insert
15: deflection pulley
20: roller(s)

DETAILED DESCRIPTION OF THE INVENTION

The welding devices corresponding to the prior art are composed of a welding rod 2 along which there are arranged the various elements necessary for the actual welding operation, such as, for example, heating elements, pressurizing elements, cooling elements and reshaping elements. These elements generally arranged above the welding rod 2 for reasons of practicality exert a vertical pressure which contributes to generating strong friction between the sheet 3 and the lower face of the welding rod 2 when forming the tube.

In order to eliminate the strong friction between the welding sheet and the lower face of the welding rod, use is made according to the principle of the invention of means reducing the friction between the sheet 3 and the welding rod 2. These means may be static or mobile, as will be understood in the light of the following description.

Figure 2:
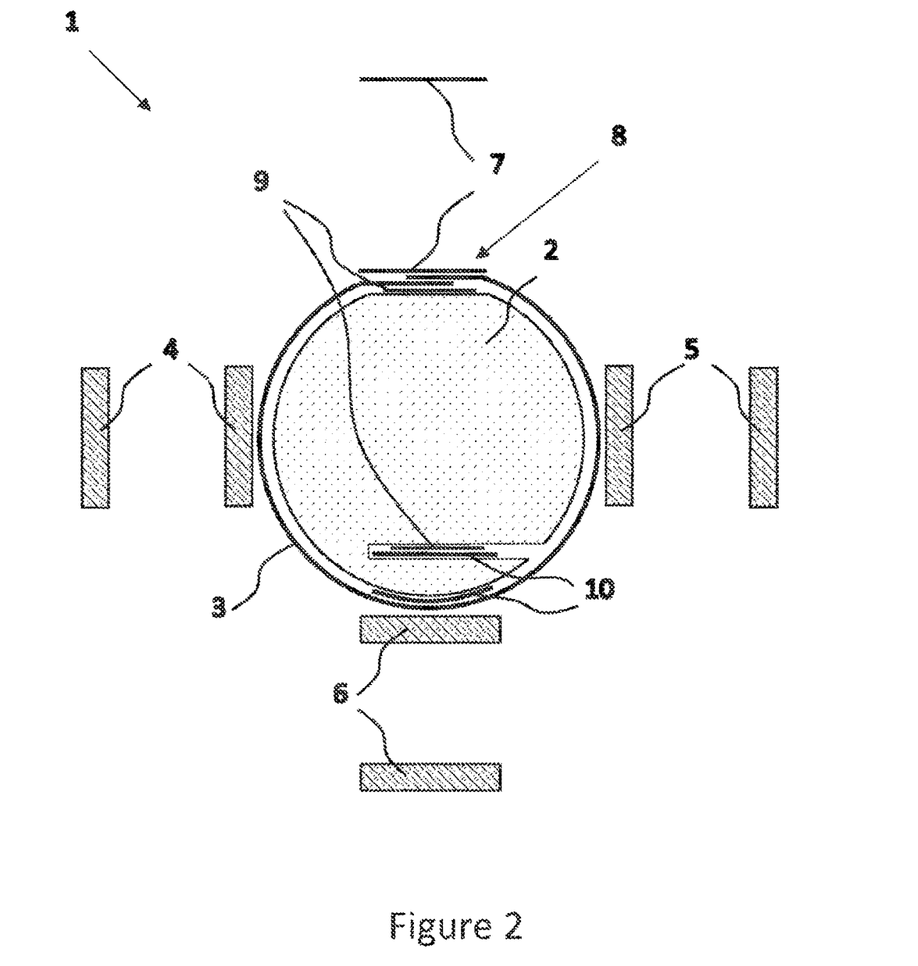

An example of the invention according to one embodiment is illustrated in FIG. 2, and it comprises the addition of an antifriction belt 10 which moves at the same speed as the sheet 3.

Figure 6:
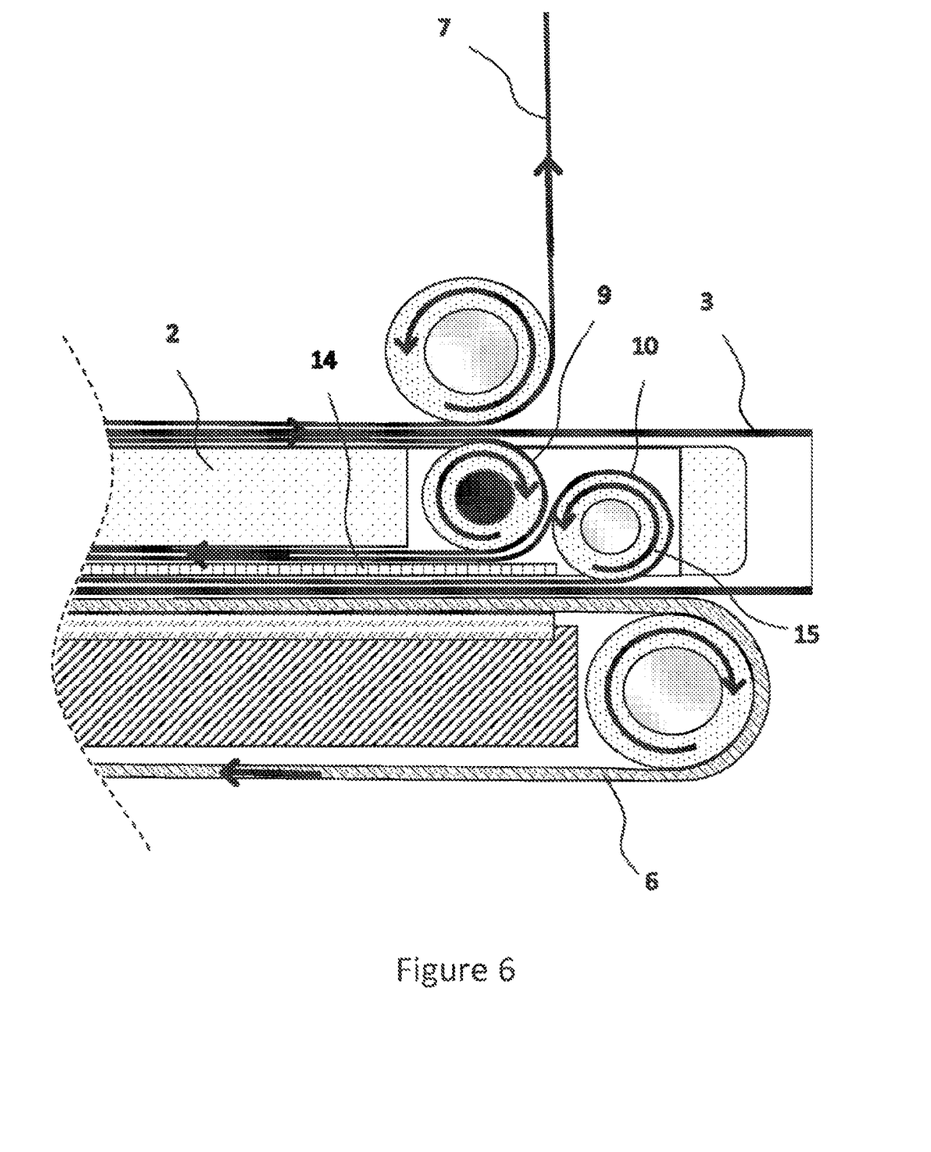
FIG. 6 illustrates a sectional view along the longitudinal axis of the embodiment in FIG. 5.

According to this embodiment of the invention, this antifriction belt 10 is positioned opposite the lower drive belt 6 which is in contact with the outer face of the sheet 3 (see the principle illustrated in FIG. 6).

The antifriction belt 10 is in contact with the inner face of the sheet 3 and makes it possible to avoid the friction of the inner face of the sheet 3 against the rod 2. Preferably, the antifriction belt 10 moves at the same speed as the sheet 3.

According to one embodiment, the antifriction belt 10 is driven by the sheet 3. According to a second embodiment, the belt 10 is driven by a motor. According to a third embodiment, the belt 10 is driven by the welding belt 9, for example by rubbing against the latter. Other equivalent means are of course possible and, in the case where a device comprises at least two belts, each belt may or may not call upon a different drive means. These drive means can of course be used in all the embodiments of the invention.

According to one embodiment of the invention, the coefficient of static friction $C_f$ between the antifriction belt 10 and the sheet 3 is greater than the coefficient of static friction $C_t$ between the antifriction belt 10 and the rod 2. According to the invention, the ratio $C_f/C_t$ is greater than 1 and preferably greater than 1.5.

In order to obtain a favorable ratio $C_f/C_t$, a first solution consists in adapting the surface properties of the rod by adjusting its roughness and the surface treatment and/or by applying a fine-thickness coating. For example, a Résiflon-type coating can be used.

The antifriction belt 10 is preferably chosen to have a low thickness. Its thickness is less than 3 mm and preferably less than 1 mm. Preferably, the thickness of the belt varies weakly.

The width of the antifriction belt 10 can vary as a function of the diameter of the tube. Preferably, the width of the belt 10 is greater than 3 mm and preferably greater than 6 mm.

Preferably, the antifriction belt is made of single-layer or multilayer synthetic material. The belt can also be metallic, preferably having a thickness of less than 0.25 mm. Other equivalent materials are possible.

Figure 3:
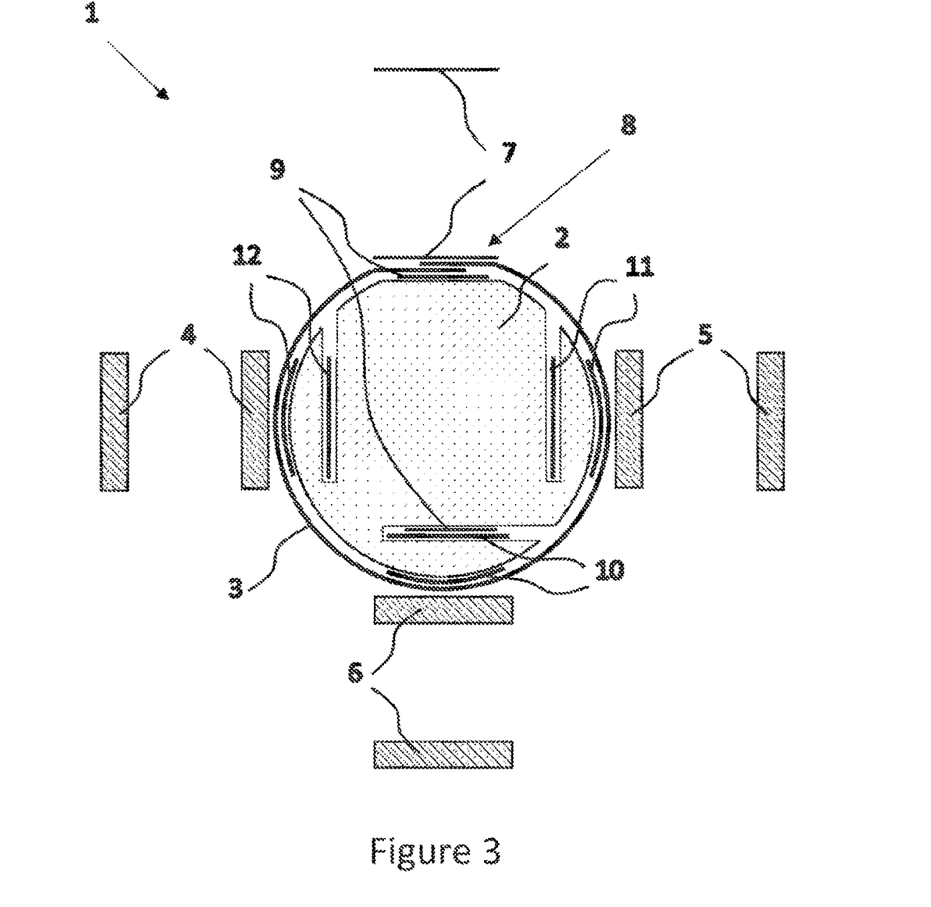
FIG. 3 illustrates a second embodiment of the low-friction drive device according to the invention. This device comprises antifriction belts 10, 11 and 12 respectively in front of the drive belts 6, 5 and 4.

Another embodiment of the invention is illustrated in FIG. 3. A first antifriction belt 10 is positioned opposite the lower drive belt 6, as in the embodiment of FIG. 2. A second antifriction belt 12 is positioned opposite the lateral drive belt 4. A third antifriction belt 11 is positioned opposite the lateral drive belt 5. Using this drive device with three antifriction belts 10-12, the friction between the sheet 3 and the rod is almost completely eliminated. The characteristics of the belts 11 and 12 are, for example, the same as those of the belt 10 described above. According to other embodiments, the characteristics of the belts can be different according to the circumstances, for example. The number of belts is of course not limited to the examples of FIGS. 2 and 3. At least one antifriction belt is added as described above and preferably opposite the drive belt 6. Each antifriction belt can be one piece, or can comprise two (or more) belts in parallel according to the circumstances.

Figure 4:
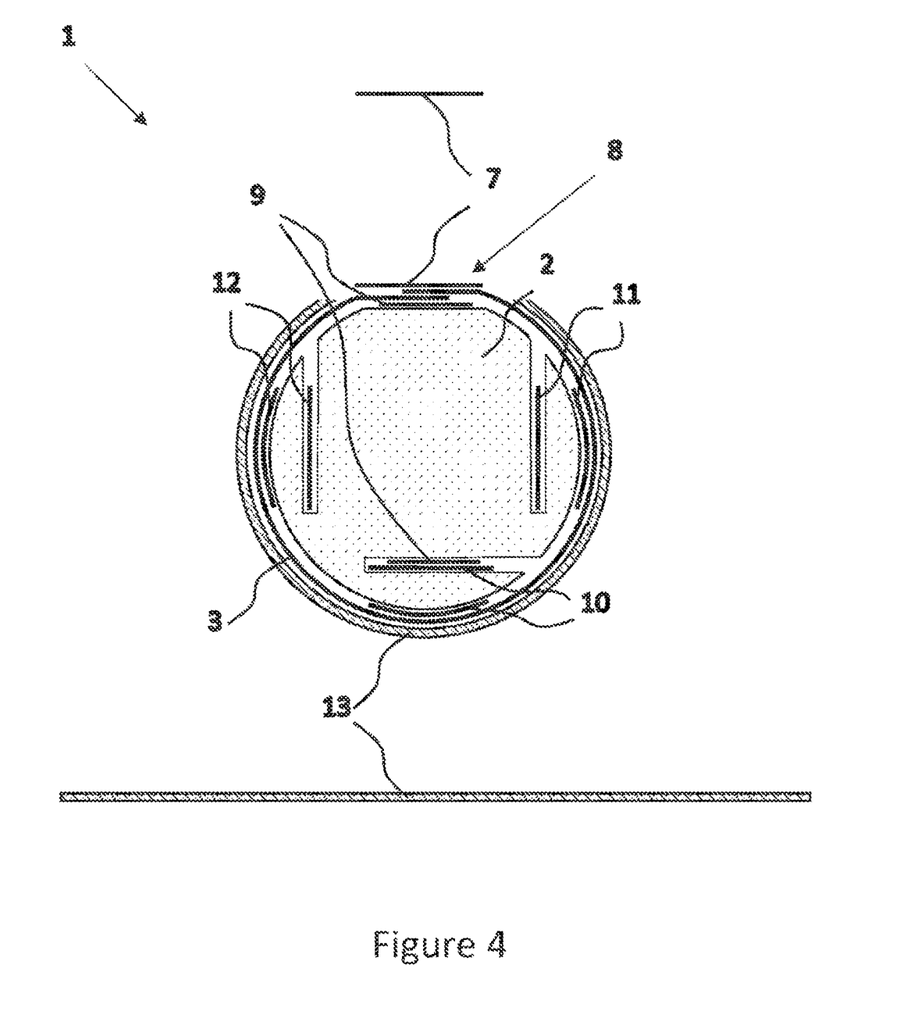
FIG. 4 illustrates a third embodiment of the invention where the drive belt 13 is an enveloping belt.

Another embodiment of the invention is illustrated in FIG. 4. In this embodiment, it is an enveloping belt 13 which drives the sheet 3 instead of the belts 4-6. The antifriction belts 10, 11, 12 make it possible to strongly reduce the friction between the sheet 3 and the rod 2. This embodiment using this enveloping drive belt 13 can be used with embodiments comprising a single antifriction belt (as in FIG. 2) or a plurality thereof (two, three, etc.).

The choice of the solutions for housing the antifriction belts in the welding rod 2 depends mainly (but not exclusively) on the diameter of the welding rods and of the elements already integrated in said rod, such as, for example, cooling circuits, electromagnetic inductors or pressure rollers. A first solution illustrated in FIGS. 2, 3 and 4 is, for example, that of producing ribs to position the return of the antifriction belts.

Figure 5:
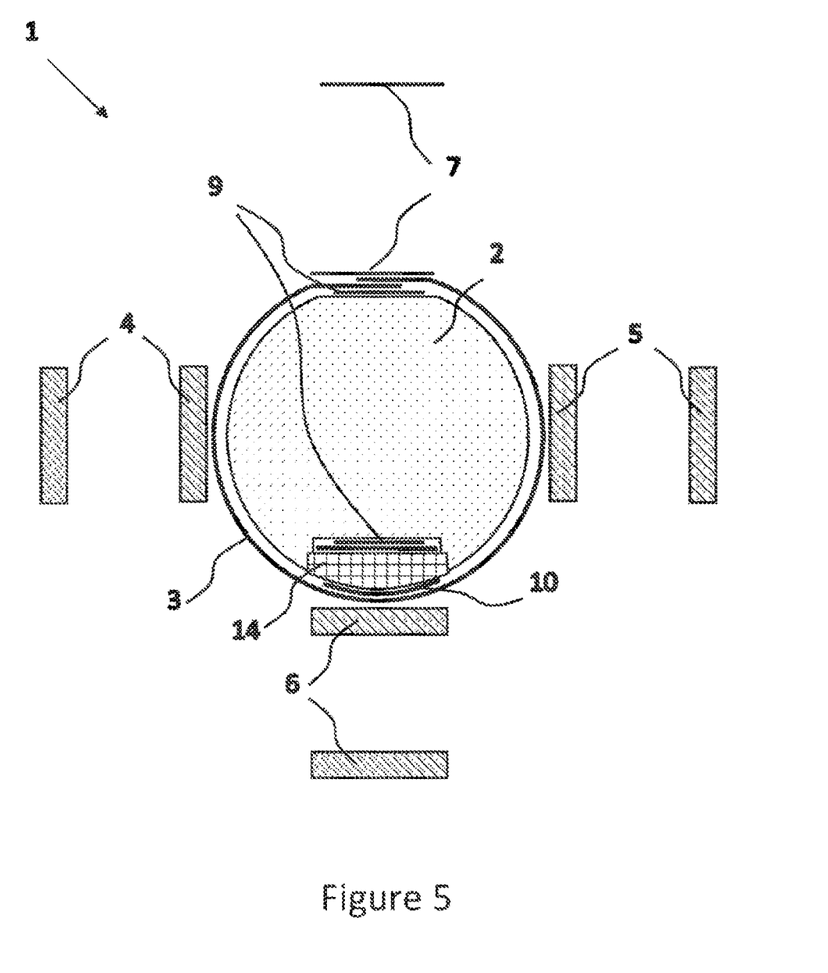
FIG. 5 illustrates another example of integrating the antifriction belt in the welding rod.

Another exemplary embodiment illustrated in FIGS. 5 and 6 is to form a groove and to position an insert 14 which traps the antifriction belt 10 within the rod 2 and jointly serves as a friction piece with the belt 10. These housing embodiments can be combined on one and the same rod 2 when it comprises at least two antifriction belts. The construction principle illustrated in FIG. 6 is of course applicable to all the embodiments of the invention (for example those of FIGS. 2 to 4) without using an insert 14. In this figure there can also be seen a deflection pulley 15 for the belt 10 that makes it possible to convey the belt 10 in a closed loop.

The invention is not limited to the above examples and embodiments. It is possible to increase the number of belts beyond three, for example in order to better follow the outer face of the rod 2. Alternatively, it is possible to increase the size of the antifriction belt 10 so that it covers a larger area of the rod 2.

In another embodiment, the three belts 10-12 of FIG. 3 or 4 can be combined into a single belt of equivalent size, or the individual belts 10-12 can be separated into a plurality of belts of smaller size.

In other embodiments, there can be provided other means equivalent to the belts described, for example a particular surface treatment of the rod 2 to reduce the coefficient of friction. It is also possible to combine these means: surface friction and antifriction belts.

Figure 7:
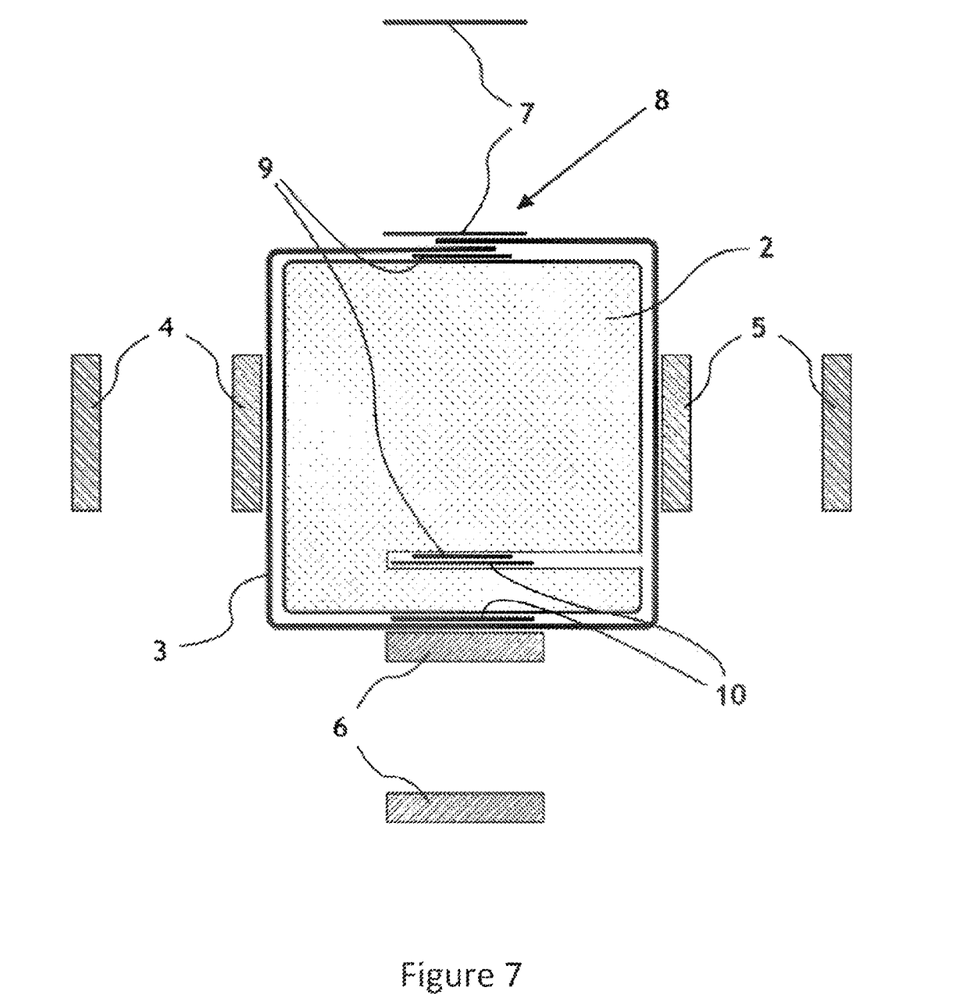
FIG. 7 illustrates another embodiment of the invention in which the tube has a square cross section.

In some embodiments, the cross section of the rod 2 can have a shape other than circular, as illustrated in FIGS. 2 to 5: it can, for example, be oval, square, rectangular, pentagonal, hexagonal, etc. Such shapes can in particular facilitate the passage of the antifriction belt(s). An example is illustrated in FIG. 7 which shows a rod 2 of square cross section in a general embodiment corresponding to that of FIG. 2. This shape (or another) can apply to all the embodiments of the invention, in particular to those of FIGS. 3 to 6, and to those described above. The shape/cross section can be constant over the whole length of the tube or it can vary, for example to pass from one shape to another shape.

Figure 8:
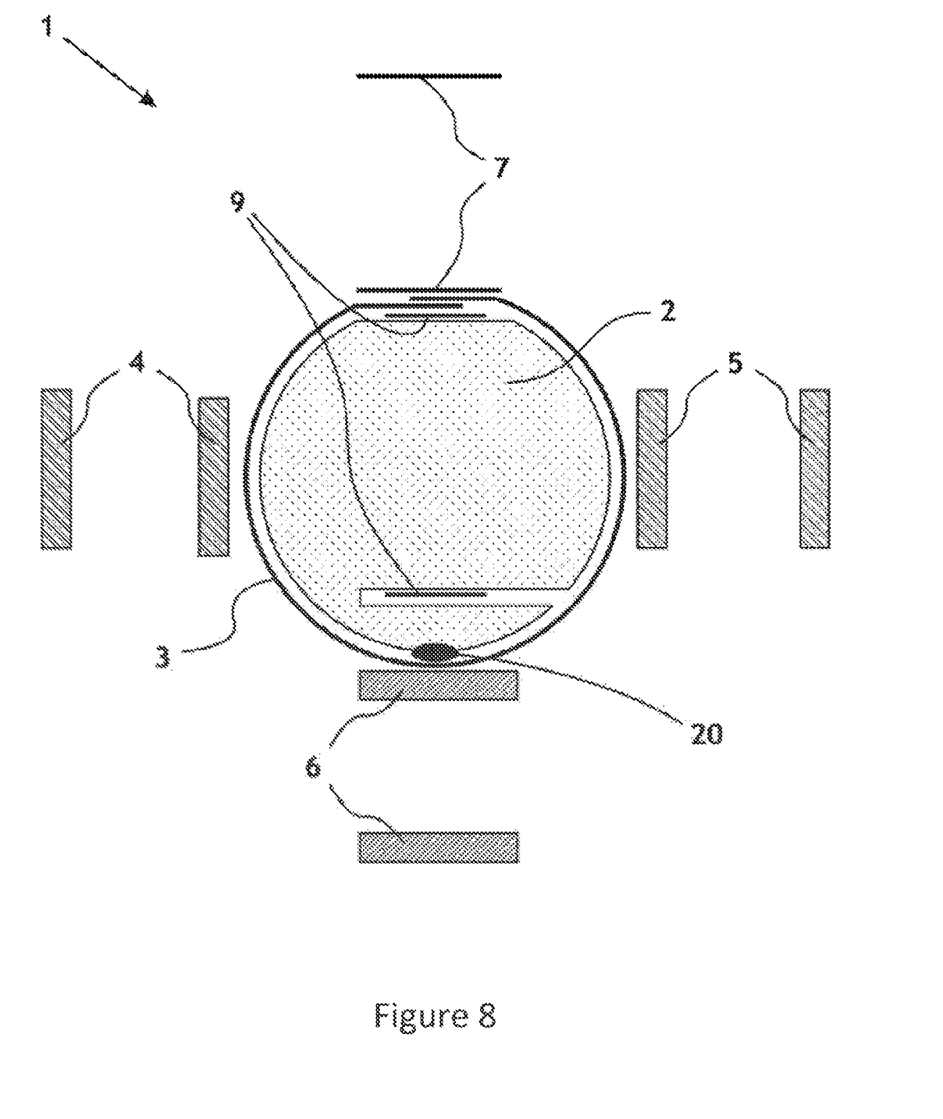
FIG. 8 illustrates another embodiment of the invention in which rollers are used.
Figure 9:
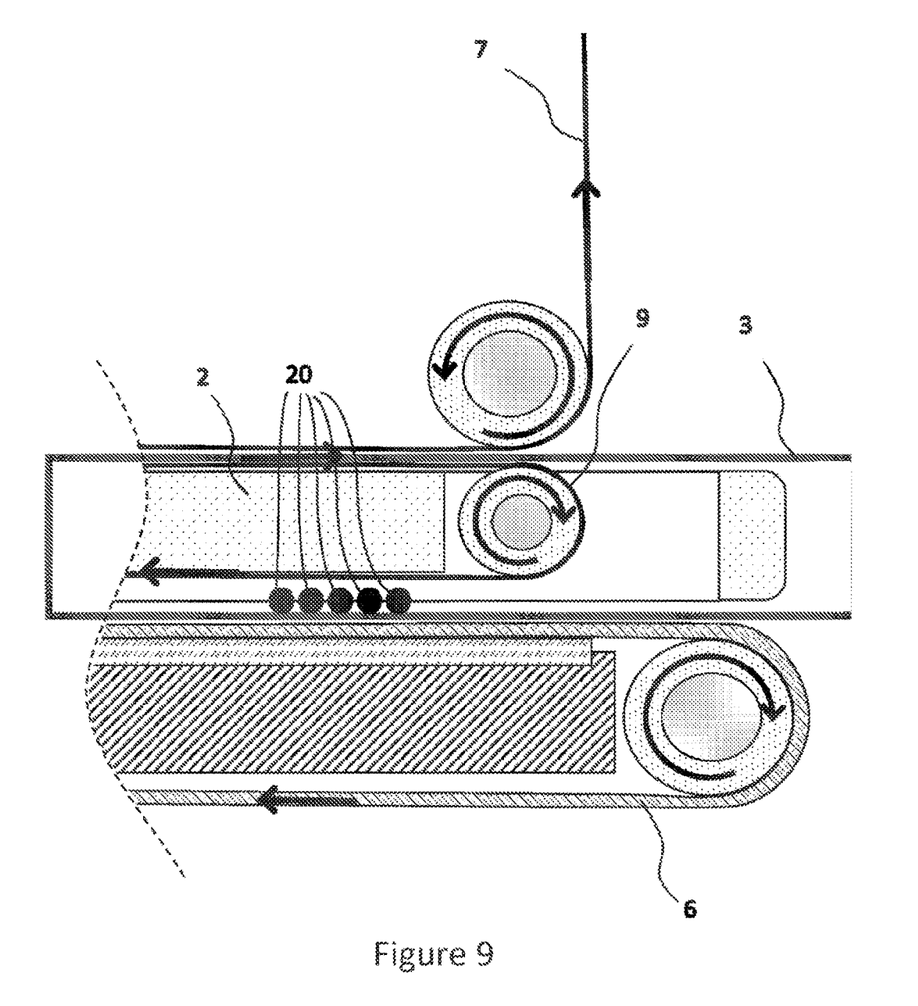
FIG. 9 illustrates a sectional view along the longitudinal axis of the embodiment in FIG. 8.

In another embodiment, use can be made of rollers 20 (that is to say rotating elements) in place of an antifriction belt 10 as described, or in combination with an antifriction belt 10. An example with such rollers 20 is illustrated in FIGS. 8 and 9. As illustrated in FIG. 8, the shape of the roller(s) preferably follows that of the rod 2. The number of the rollers can be adapted according to the circumstances and is not limited to that illustrated in FIG. 9. Moreover, the roller(s) 20 can be mounted in free rotation (for example on an axle) or be driven to rotate directly or indirectly by a motor. If a plurality of rollers 20 are used, the motor drive can occur with a single roller 20 or a plurality thereof. The rollers 20 can be made of any suitable material (metal, synthetic or mixtures, for example).

The use of the rollers 20 is possible in all the embodiments (for example those illustrated in FIGS. 2 to 7) and the rollers 20 can be used alone or in combination with other antifriction means, such as one or more belts as described in the present application.

All the embodiments described and envisioned within the scope of the present application can of course be combined with one another. The circumstances may favor one embodiment or another, and the means used among the possible combinations.

The embodiments described are by way of illustrative examples and should not be considered to be limiting. Other embodiments may call upon means equivalent to those described, for example. The embodiments can also be combined with one another according to the circumstances, or means used in one embodiment can be used in another embodiment.

The invention claimed is:

1. A welding device for forming a packaging tube from a sheet, the welding device comprising:
    a welding rod, the sheet being wrapped around the welding rod;
    a device configured to weld and pressurize ends of the sheet with a welding zone using an outer welding belt and an inner welding belt, the outer welding belt and the inner welding belt pressurizing and welding the ends of the sheet;
    a mechanism configured to drive the sheet along the welding rod, said mechanism comprising at least one drive belt in contact with an outer face of the sheet; and
    a friction-reducing device configured to reduce a friction between the welding rod and the sheet, the friction-reducing device being in contact with the sheet and moving at a same speed as the sheet relative to the welding rod, the friction-reducing device including at least one antifriction belt in contact with an inner face of the sheet, the at least one antifriction belt being disposed opposite said at least one drive belt.

2. The device as claimed in claim 1, wherein the at least one antifriction belt is disposed radially opposite the device configured to weld and pressurize, along the welding rod.

3. The device as claimed in claim 1, wherein the at least one drive belt includes three drive belts, and the at least one antifriction belt includes three antifriction belts disposed opposite said three drive belts.

4. The device as claimed in claim 1, wherein the mechanism configured to drive the sheet along the welding rod is configured to move the sheet at a same speed as a speed of the at least one antifriction belt.

5. The device as claimed in claim 1, wherein the at least one antifriction belt is driven by the sheet that is being welded, by a motor, or by a welding belt of the device configured to weld and pressurize.

6. The device as claimed in claim 1, wherein a coefficient of static friction Cf between the at least one antifriction belt and the sheet is greater than a coefficient of static friction Ct between the at least one antifriction belt and the welding rod.

7. The device as claimed in claim 6, wherein a ratio Cf/Ct is greater than 1.5.

8. The device as claimed in claim 6, wherein a coating is disposed on a surface of the welding rod to obtain a ratio Cf/Ct.

9. The device as claimed in claim 1, wherein the at least one antifriction belt has a thickness of less than 3 mm.

10. The device as claimed in claim 1, wherein a width of the at least one antifriction belt is selected as a function of the diameter of the packaging tube.

11. The device as claimed in claim 1, wherein a width of the at least one antifriction belt is greater than 3 mm.

12. The device as claimed in claim 1, wherein the at least one antifriction belt is made of at least one of a single-layer synthetic material, a multilayer synthetic material, and a metal.

13. The device as claimed in claim 1, further comprising:
    an insert configured to trap the at least one antifriction belt within the welding rod and to provide for friction with the at least one antifriction belt.

14. The device as claimed in claim 1, wherein a cross section of the packaging tube is one of circular, oval, rectangular, and square.

15. The device as claimed in claim 1, wherein a cross section of the packaging tube is such that the cross section passes from one shape to another shape along a longitudinal axis.

16. The device as claimed in claim 1, wherein the at least one antifriction belt is disposed between the sheet and the rod.

* * * * *